United States Patent
Pearce et al.

[11] Patent Number: 6,065,738
[45] Date of Patent: May 23, 2000

[54] ANCHOR FOR CABLES

[75] Inventors: Philip Pearce, Aukland, New Zealand; Timothy John Heldt, Wooloowin, Australia; Stephen Cawthorne, Retford, United Kingdom

[73] Assignee: Brifen Limited, United Kingdom

[21] Appl. No.: 08/865,454

[22] Filed: May 29, 1997

[30] Foreign Application Priority Data

Nov. 29, 1996 [AU] Australia ................................ 74061/96

[51] Int. Cl.$^7$ .............................. E04H 17/02; B68B 3/00
[52] U.S. Cl. .............................. 256/13.1; 256/32; 256/35; 403/2
[58] Field of Search .................. 256/32, 35, 31, 256/13.1, 64, 1, 12.5; 403/371, 368, 367, 2; 52/223.3, 166, 149, 148, 146; 244/110 C; 404/6, 7

[56] References Cited

U.S. PATENT DOCUMENTS

| | | | |
|---|---|---|---|
| 2,987,299 | 6/1961 | Kneen | 256/32 X |
| 3,185,445 | 5/1965 | Broadway | 256/13.1 |
| 3,390,865 | 7/1968 | Jehu | 256/13.1 |
| 3,512,758 | 5/1970 | Thomas | 256/13.1 |
| 4,662,134 | 5/1987 | Illgner | 403/371 X |
| 4,838,523 | 6/1989 | Humble et al. | 256/13.1 |
| 5,022,782 | 6/1991 | Gertz et al. | 256/13.1 |
| 5,039,066 | 8/1991 | Stacey | 256/13.1 |
| 5,301,926 | 4/1994 | Sharp | 256/24 |
| 5,474,408 | 12/1995 | Dinitz et al. | 256/13.1 X |
| 5,797,591 | 8/1998 | Krage | 256/13.1 |

FOREIGN PATENT DOCUMENTS

| | | |
|---|---|---|
| 3505622C1 | 8/1986 | Germany. |
| 4302506A1 | 8/1994 | Germany. |
| 19628713A1 | 1/1997 | Germany. |

OTHER PUBLICATIONS

ICS Handbuch "Automatische Schraubmontage" (ICS Manual Automatic Screw Mounting), 1st ed. 1993, pp. 54,55,208,209.

*Primary Examiner*—Lynne A. Reichard
*Assistant Examiner*—John R. Cottingham
*Attorney, Agent, or Firm*—Cesari and McKenna, LLP

[57] ABSTRACT

A cable safety barrier has means for disengagement of the cable from an anchor portion of the cable safety barrier when certain vehicle impact conditions are met. Disengaging of the cable may involve allowing a cable end fitting to escape from an open ended slot, when the cable is deflected upwards, or causing the cable fitting to fail.

15 Claims, 5 Drawing Sheets

ANCHOR FOR CABLES

BACKGROUND TO THE INVENTION

1. Field of the Invention

This invention relates to anchors for cables and has particular application with respect to safety fences designed to redirect or prevent passage of vehicles over prohibited ground and is particularly, but not exclusively, applicable to safety fences used on the sides of roads or central reservations of high-speed carriageways, roads or motorways, or embankments.

2. Prior Art

Many different road safety barriers are available and in use throughout the world. One known type of barrier is a wire cable safety barrier which generally consists of tensioned horizontal cables attached to a number of upright posts spaced a certain distance apart. Wire cable safety barriers have the ability to significantly reduce vehicle damage and occupant injury upon impact when compared with other available types of road barriers.

However, there is still a small risk of serious vehicle damage and occupant injury if a vehicle happens to impact the barrier under certain conditions. This danger arises on impact close to an anchorage portion (where the cables terminate) of such fences and/or where part of a vehicle may get jammed under a cable. Under these conditions the vehicle may be brought abruptly to a halt.

It would therefore be desirable to be able to provide an improved anchorage for wire cable safety barriers or at least one that provides the public with a useful choice.

SUMMARY OF THE INVENTION

In one aspect the invention provides a cable anchoring device comprising a body adapted to be secured to a substrate and including means for attaching a portion of the cable to the body and disengaging means whereby a predetermined deflection of the cable results in the disengagement of the cable from the anchoring means.

In another aspect the invention provides a cable safety barrier having a plurality of posts, and one or more cables tensioned between said posts, wherein each cable is anchored at least one end and having disengaging means on or adjacent to the anchor and adapted to disengage the cable if the cable is displaced sideways/vertically by more than a predetermined amount.

In one version the cable can be held in an open ended slot or cavity and allowed to escape from the slot or cavity if the cable is deflected by more than a predetermined amount. In another version the cable or cable attachment is designed to fail if the cable is deflected by more than a predetermined amount.

Preferably the cable is held in the anchoring body at an angle of 3°–16° relative to the ground. More preferably the cable is held in the anchoring body at an angle of 4°–10° relative to the ground.

Preferably the cable or cable fitting will escape or fail if the angle of the cable exceeds a predetermined angle in the range of 10°–35°, more preferably 12°–24°.

Preferably there is a cable fitting connected to the cable and adapted to be attached to the anchoring body. The connection may, for example, be a mechanical connection or a swaged connection.

In one version the fitting has a narrowed portion adapted to be sheared by the disengaging means.

In one version, the disengaging means is part of the anchoring means but in some applications the disengaging means may be placed apart from the anchoring means.

The disengaging means may be adapted to shear the cable fitting and can have a fixed spatial relationship to the cable in use so that the cable is spaced apart from the disengaging means in normal use but a predetermined displacement of the tensioned cable results in it causing the cable fitting to shear or fracture. In this version, the disengaging means adapted to shear the cable fitting comprises a shearing edge. The disengaging means may comprise one or more sharp edges attached to the anchoring body and forming an angle with the line of the cable. Optionally, the shearing edge and the fitting are both made of steel. Optionally, the threaded fitting is made of a grade of steel with suitable flow characteristics for the swaging process, and has high tensile strength but is adapted to fracture locally at a predetermined position when subjected to sideway or vertical displacement.

The anchoring body may be adapted to be set into a concrete foundation and may be adapted to be located substantially below ground level.

In one preferred embodiment the safety barrier comprises at least one cable and an anchor body which has an aperture adapted to receive the cable, the aperture being an open ended slot. The cable can be held in the open ended slot in the anchor body and allowed to escape from the slot if the cable is deflected by more than a predetermined amount. Preferably the cable is held in the anchor body at an angle of 3°–16° relative to the ground, the open ended slot in the anchor body being angled 0°–16° from the vertical and away from the line of the cable approaching the body. The cable is held in its slot by cooperating abutment surfaces on the attachment means (cable fitting) and the anchor body, respectively, preferably with the interposition of a bearing plate, which preferably includes a non-metallic surface adjacent the anchoring body.

Typically the anchor body is of metal and the bearing plate is of metal and the non-metallic surface comprises a layer of plastics material sandwiched between the metal plate and the anchor body. The plastics material is preferably chosen from the group of engineering plastics including nylon, PTFE, and high density polyethylene.

BRIEF DESCRIPTION OF THE DRAWINGS

The invention will now be described further, by way of example only, with reference to the accompanying drawings, in which.

FIRST EMBODIMENT

Figure 1:
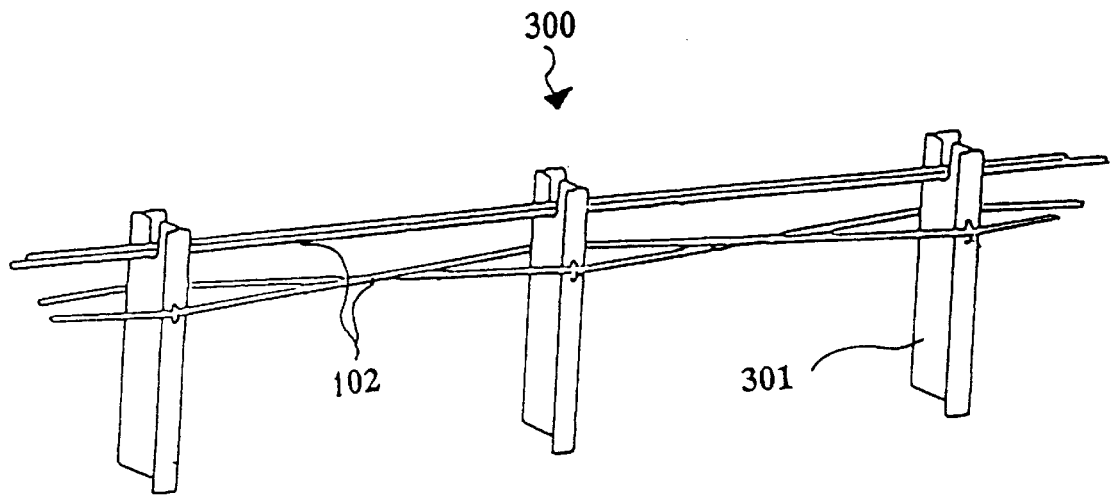
FIG. 1 is a perspective view of a wire cable safety barrier.
Figure 2:
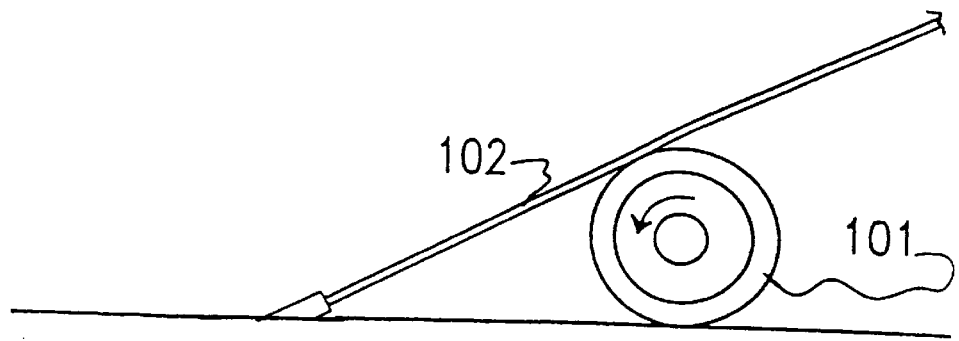
FIG. 2 is a side view of the anchored end of a cable of the safety barrier of FIG. 1 in relation to a vehicle wheel.

A cable safety barrier 300 consists of one or more upright posts 301 spaced apart and adapted to fold downwards on impact by a vehicle. Tensioned between the posts 301 are one or more cables 102 adapted to absorb a collision load of a vehicle and leading from the last post to an anchoring device 200 (FIG. 3) comprising an anchor body 201 which is set in a concrete foundation 205, below ground level.

A threaded fitting 204 is swaged to a cable 102 and attached to the anchor body 201 through a slot 206 in the anchor body 201. The anchor body 201 is adapted to receive the cable at an angle and is a substantially thick plate structure angled and set in a concrete foundation 205. The threaded fitting 204 is held within the anchor body 201 by at least one fastener 203 on the rear side of the body 201.

Figure 4:
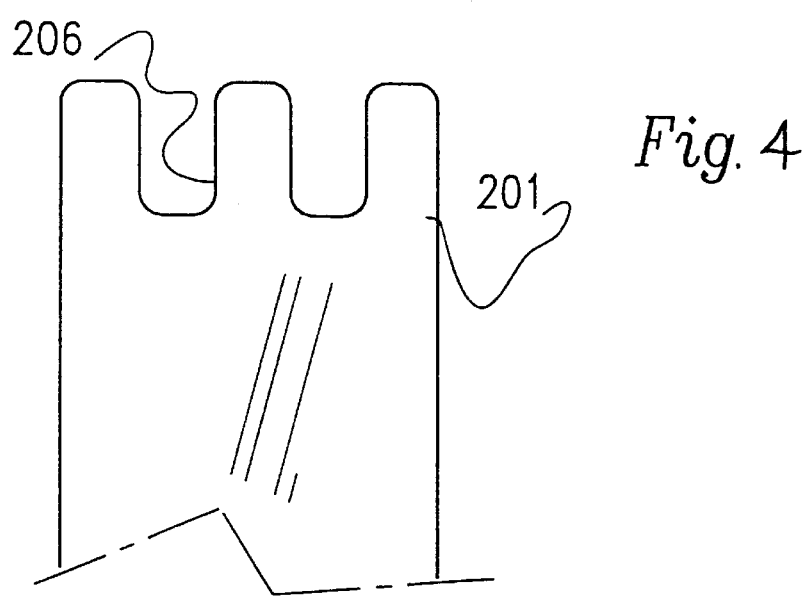
FIG. 4 is an end view of an anchor body used in the anchoring device of FIG. 3.

The slot 206 is elongate and located on the upper edge of the anchor body 201. The slot 206 has one open side on the uppermost end of the anchor body 201. The axis of the slot lies in a plane which may be vertical (as illustrated in FIG. 4) or angled obliquely sideways and upwards, in a direction away from the carriageway.

The tension of the cable 102 holds fitting 204 firmly in place owing to the abutment of the front surface 203a of the fastener 203 against the rear surface 201a of anchor body 201. The fastener 203 prevents the fitting 203 from being pulled free along the slot 206 except when certain impact conditions are met.

Preferably the anchor body 201 is angled approximately 0°–16° from a vertical line and away from the cable 102 approaching the anchoring body 201, and more preferably is angled from 3°–10°.

If the cable 102 gets jammed over a wheel or other part of a vehicle (as shown in FIG. 1), as the vehicle approaches the anchorage the cable will be lifted upwards, increasing the gradient of the cable and increasing the angle between the cable and the ground. With the upward lifting of the cable the threaded fitting 204 will slide upwards in the slot 206 and will eventually disengage completely from the anchor body 201.

One advantage of this embodiment is the ease of repair when the cable is so disengaged. It is likely that neither the cable nor the anchor body are damaged during the process of disengagement and the cable can simply be reattached to the anchor body by reinserting it in the slot of the anchor body and retensioning the cable.

SECOND EMBODIMENT

Figure 3:
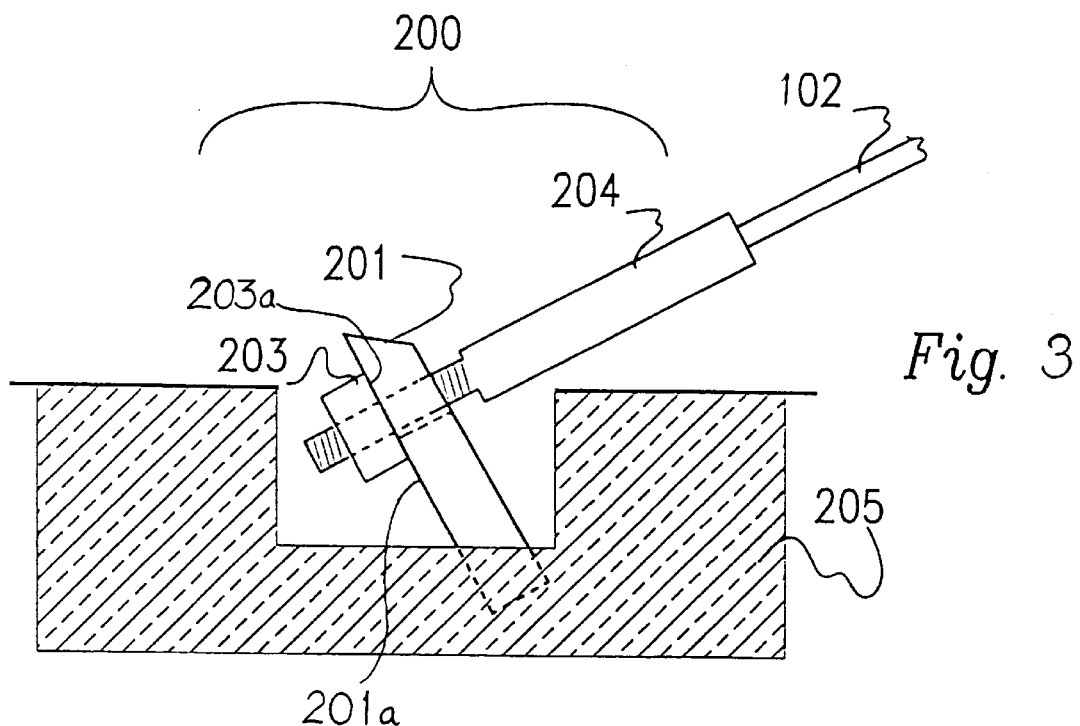
FIG. 3 is a side view of an anchoring device, in a first embodiment.
Figure 5:
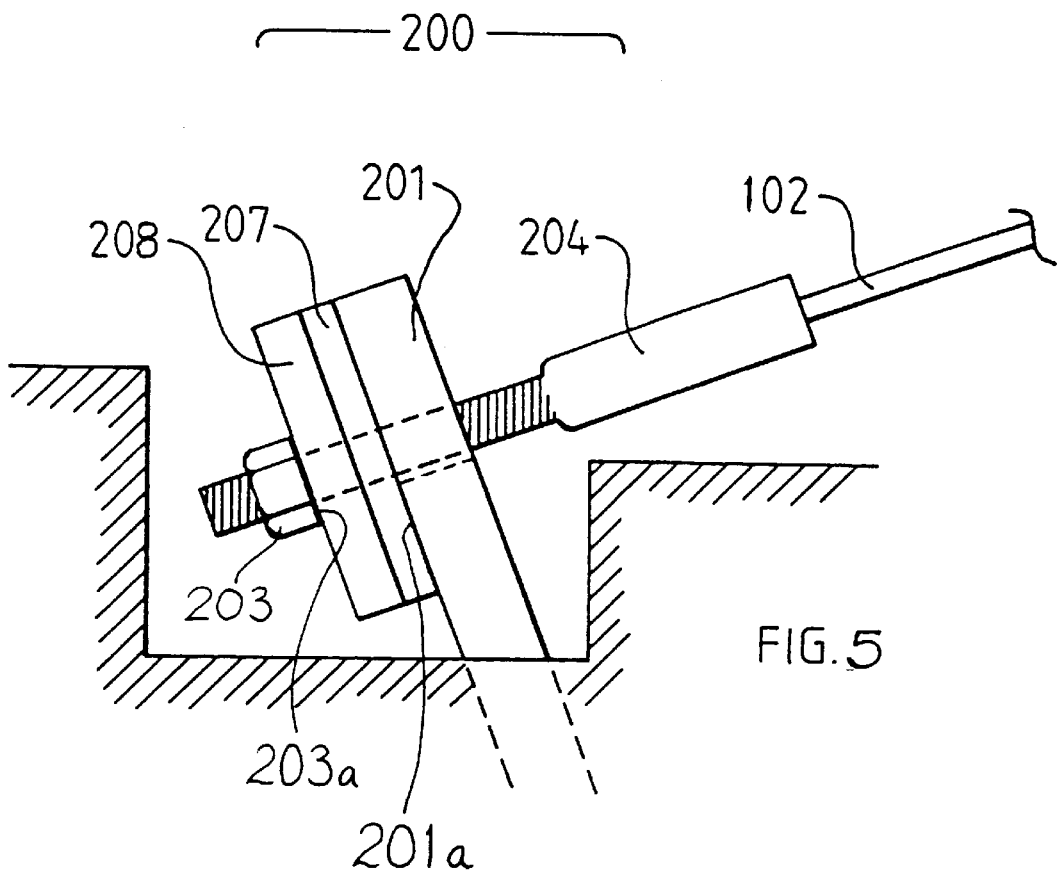
FIG. 5 is a side view of an anchoring device, in a second embodiment.
Figure 6:
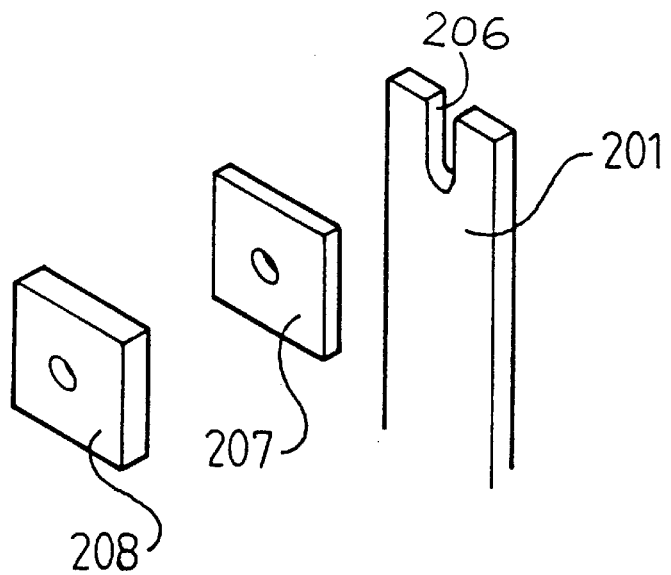
FIG. 6 is an exploded perspective view of parts of the anchoring device of FIG. 5.
Figure 7:
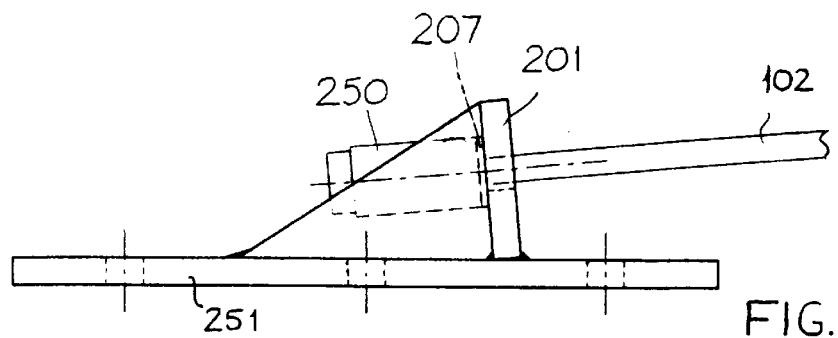
FIG. 7 is a side view of an anchoring device, in a third embodiment.
Figure 8:
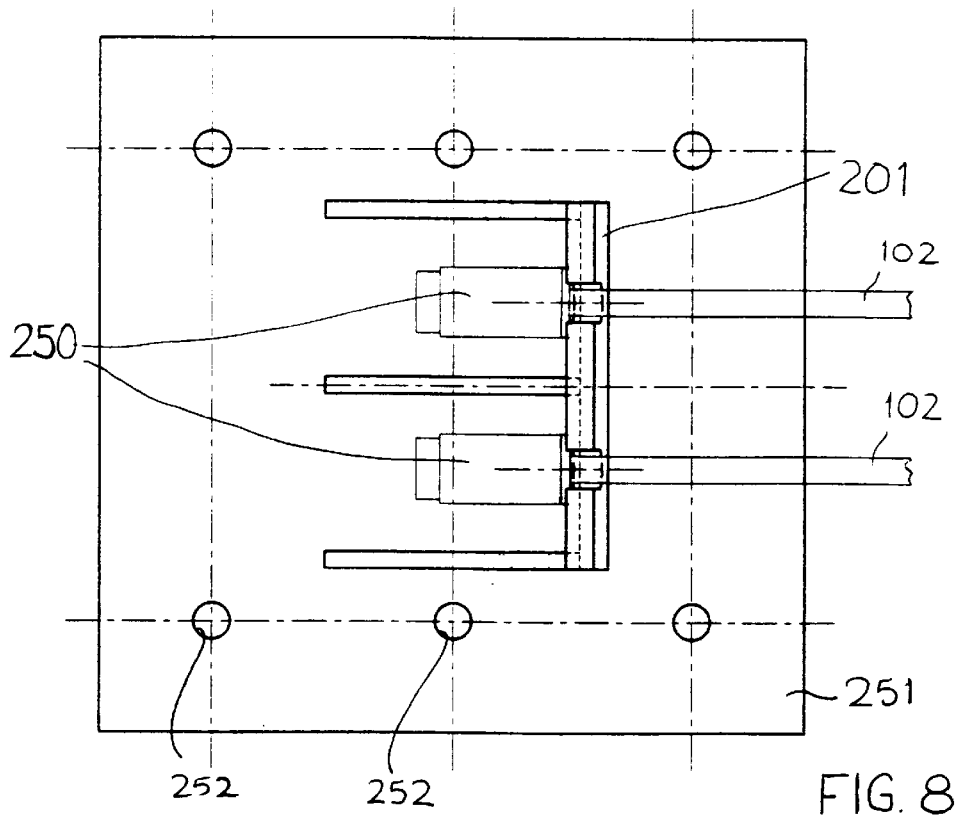
FIG. 8 is a plan view of the anchoring device of FIG. 7.
Figure 9:
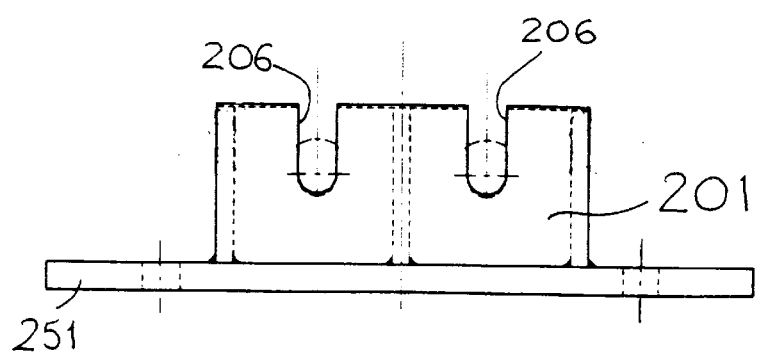
FIG. 9 is a front end view of an anchor body used in the anchoring device of FIG. 7.
Figure 10:
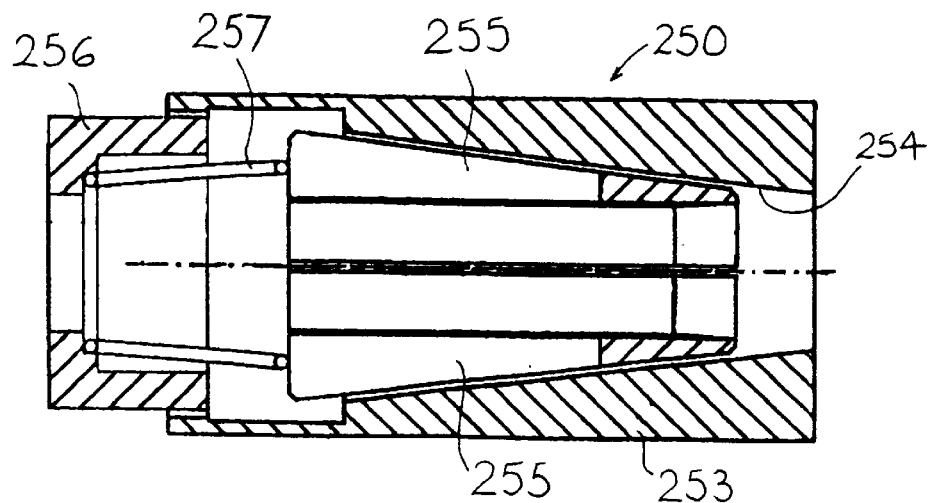
FIG. 10 is an axial section through a cable end fitting used in the anchoring device of FIG. 7.

A variation of the embodiment shown in FIG. 3 can be seen in FIGS. 5 and 6. This variation incorporates an intermediate member 207 and a bearing member 208 between the anchor body 201 and the fastener 203. (The intermediate member 207 may be provided alone, without any other bearing member, or it may be in the form of a surface layer on the bearing member 208.) The bearing member 208 is preferably a metal plate.

Preferably the intermediate member 207 provides a means of consistent release, enabling the cable 102 to become dislodged from the anchor body 201 after a predetermined amount of deflection is applied to the cable. Preferably the intermediate member 207 is non-metallic. Preferably this member is resistant to corrosion or any major change over time in its frictional characteristics. Preferably this member is a rectangular plate or polymer such as nylon, high density polyethylene (HDPE) polytetrafluoroethylene (e.g. "Teflon" [registered trade mark]). Preferably the dimensions of this member range from 40 mm×40 mm×2 mm thick to 150 mm×150 mm×10 mm thick, and it may be rectangular or circular in shape.

Although the preferred embodiment is not restricted to any specific dimensions (cable length, diameter, etc.), preferably the dimensions range from the following:

| Cable Diameter | 16 mm | 28 mm |
| --- | --- | --- |
| Bearing Plate | 40 mm × 40 mm × 10 mm | 150 mm × 150 mm × 25 mm |
| HDPE Member | 40 mm × 40 mm × 2 mm | 150 mm × 150 mm × 10 mm |
| Anchor Body angle to the vertical | 3° | 10° |

The use of a polymer member 207 has proved to give much more consistent and predictable cable release at a cable angle of 10°–12° greater than the angle at which the anchor slot is tilted back from the vertical.

The anchoring device could be located above ground level, although it is preferable in terms of safety fence structure and space to locate the anchoring device firmly in the ground.

THIRD EMBODIMENT

A further version of the above-described embodiments is shown in FIGS. 7 to 10, in which the swaged fitting 204 is replaced by a mechanical fitting 250 attached to the end portion of a cable 102 which extends through a slot 206 in the anchor body 201. In this embodiment the front end of the fitting 250 abuts against the rear surface of the anchor body 201 with the optional interposition of an intermediate member 207 as described above. The anchor body 201 is welded to a base plate 251 having bolt 252 allowing it to be fixed to the road surface.

The fitting 250 (FIG. 10) comprises a cylindrical barrel 253 with a bore having a tapering inner surface 254, into which the cable is inserted from the narrower end. A set of wedges 255 are inserted from the opposite end of the barrel 253, between the inner surface 254 and the cable (not shown in FIG. 10). A cap 256 screwed into the barrel 253 compresses a coil spring 257 which prevents accidental release of the wedges 255, while tension in the cable urges the wedges 255 along the bore to grip the cable.

FOURTH EMBODIMENT

Figure 11:
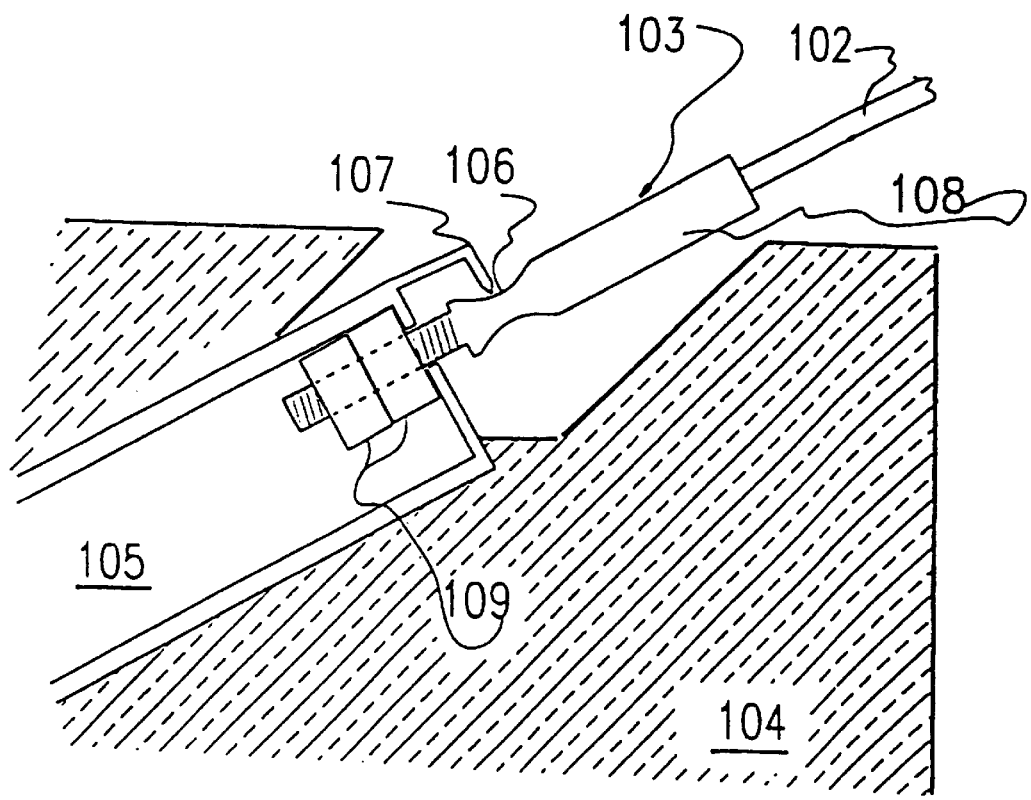
FIG. 11 is a side view of an anchoring device, in a fourth embodiment.

FIG. 11 shows an alternative form of anchoring device, which comprises an anchor body 105 which is set in a concrete foundation 104, below ground level. A threaded fitting 103 is swaged to the cable 102 and attached to the anchor body 105 through an aperture in the anchor body 105. The anchor body 105 is a substantially rectangular structure angled and set in the concrete foundation 104. The threaded fitting 103 is held within the anchor body 105 by one or more fasteners 109 on the inner side of the body 105.

The fitting 103 at its upper end comprises an unthreaded metal collar 108 which has a neck 106 that is substantially narrower than the collar part.

The fitting 103 is made of steel having suitable flow characteristics for the swaging process and high tensile strength combined with a section adapted to fracture at a predetermined position when subjected to a shearing force. High tensile strength is required to ensure the threaded fitting can withstand the high tensile load to which it is subjected under normal impact conditions. The reduced section helps to ensure that the fitting shears off at a predetermined position if certain impact conditions are met.

There is a shear blade 107 joined to and rigidly supported by the anchor body 105 and angled downwards towards the neck 106 of the metal collar 108. If the cable is lifted upwards the shear blade 107 will contact the neck 106 and cause the threaded fitting 103 to shear off.

If the cable gets jammed over a wheel 101 or other part of a vehicle, as the vehicle approaches the anchor body 105 the cable 102 will be lifted upwards, increasing the gradient of the cable and increasing the angle between the cable and the ground. The upward lifting of the cable causes contact between the shear blade and the cable. As the angle continues to increase the cable is pressed with increasing force against the shear blade and at a critical cable angle the fitting 103 will be severed through the neck 106. The normal cable angle is in the range of 3°–16° and the critical cable angle is in the range of 10°–35°.

It will be appreciated that the blade 107 need not cut all the way through the neck 106, since the initial cut caused by the blade will normally be sufficient to induce the fitting 103 to fracture under the tensile stress applied to it by the cable.

The shear edge need not be a blade or a sharpened edge. It may be sufficient in some embodiments for the cable to be forced against any rigid structure to provide the shear force.

Disengaging means (such as the shear blade) could be placed apart from the anchoring body (for example, attached to one of the posts forming part of the barrier). There may be disengaging means attached to a post of the barrier as well as to an anchor body.

Generally the cables used for barriers of the type described are steel wire ropes of a 3×7 construction and heavily galvanised to prevent corrosion. This type of cable construction is used to give the cable a high modulus of elasticity. Large outer wires provide good abrasion resistance and good corrosion resistance. However, it may be possible to use other grades of steel, other rope constructions, and other metallic or non-metallic materials in various applications.

The two lower cables are shown interweaving between the support posts. However, other cable systems are possible. In one system all four cables remain in parallel and are positioned in the slots in the tops of the posts. Alternatively, the two lower cables could be positioned on the outside of the posts, but remain parallel rather than interweaving between the posts. The improved anchor design is equally applicable to any of the above-mentioned configurations, as well as to other cable systems used for safety barriers.

Finally it will be appreciated that a variety of changes might be made to the above example without departing from the scope of the invention as set forth in the claims.

We claim:

1. A safety barrier comprising a series of posts, at least one cable which is supported by the posts so as to extend along the series of posts and which has an end portion extending downwards beyond the series of posts, an anchor body securable to a substrate beyond the series of posts, and an attachment means for attaching the end portion of the cable to the anchor body, the attachment being fixed on said end portion, and the anchor body having disengagement means for causing the attachment to disengage the cable from the anchor body in response to a predetermined deflection of said end portion of the cable, said disengagement means being adapted to shear the attachment so as to cause said attachment to fracture under tension applied by the cable when said end portion of the cable is deflected by a predetermined amount.

2. A safety barrier as claimed in claim 1, in which the attachment has a narrowed portion adapted to be sheared by the disengagement means.

3. A safety barrier comprising a series of posts, at least one cable which is supported by the posts so as to extend along the series of posts and which has an end portion extending downwards beyond the series of posts, an anchor body securable to a substrate beyond the series of posts, and an attachment for attaching said end portion of the cable to the anchor body, the attachment being fixed on said end portion, the anchor body having a first abutment surface facing away from the series of posts and the attachment having a second abutment surface facing the first abutment surface, the abutment surfaces being urged towards each other by tension applied to the cable, and the anchor body having disengagement means for allowing the attachment to escape from the anchor body in a direction parallel to the abutment surfaces in response to a predetermined deflection of said end portion of the cable, thereby to disengage the cable from the anchor body.

4. A safety barrier as claimed in claim 3, in which the disengagement means is an open ended slot.

5. A safety barrier as claimed in claim 4, in which said end portion of the cable extends through the slot.

6. A safety barrier as claimed in claim 5, in which the attachment comprises a barrel with a bore having a tapering inner surface, for receiving said end portion of the cable, wedges inserted between the inner surface and said end portion of the cable, and means for urging the wedges along the bore so as to grip said end portion of the cable.

7. A safety barrier as claimed in claim 3, in which the abutment surfaces are angled upwardly and away from the series of posts at up to 16° from the vertical.

8. A safety barrier as claimed in claim 7, in which said end portion of the cable approaches the anchor body at an angle of 3° to 16° relative to the horizontal.

9. A safety barrier as claimed in claim 3, in which the cable will become disengaged from the anchor body if the cable is deflected so that said end portion of the cable approaches the anchor body at an angle greater than a predetermined angle in the range of 10° to 35° relative to the horizontal.

10. A safety barrier as claimed in claim 3, in which the cable will become disengaged from the anchor body if the cable is deflected so that said end portion of the cable approaches the anchor body at an angle greater than a predetermined angle in the range of 12° to 24° relative to the horizontal.

11. A safety barrier as claimed in claim 3, in which a non-metallic layer is provided adjacent the first abutment surface.

12. A safety barrier as claimed in claim 11, in which the non-metallic layer is constituted by an intermediate member between the first and second abutment surfaces.

13. A safety barrier as claimed in claim 11, including a bearing member between the first and second abutment surfaces, the non-metallic layer being in contact with the bearing member and the anchor body.

14. A safety barrier as claimed in claim 11, in which the non-metallic layer consists of plastics material.

15. A safety barrier as claimed in claim 14, in which the plastics material is selected from the group of engineering plastics comprising nylon, high density polyethylene, and polytetrafluoroethylene.

* * * * *